(12) United States Patent
Flat et al.

(10) Patent No.: US 7,820,562 B2
(45) Date of Patent: Oct. 26, 2010

(54) STRUCTURE MADE FROM A THERMOPLASTIC COMPOSITION OF A POLYOLEFIN FUNCTIONALISED BY POLYETHER GRAFTS AND USE THEREOF

(75) Inventors: Jean Jacques Flat, Goupillieres (FR); Marius Hert, Serquigny (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/279,609

(22) PCT Filed: Feb. 15, 2007

(86) PCT No.: PCT/FR2007/050805

§ 371 (c)(1),
(2), (4) Date: Dec. 10, 2008

(87) PCT Pub. No.: WO2007/093745

PCT Pub. Date: Aug. 23, 2007

(65) Prior Publication Data
US 2009/0092816 A1 Apr. 9, 2009

(30) Foreign Application Priority Data
Feb. 16, 2006 (FR) .................................. 06 01353

(51) Int. Cl.
*B32B 5/18* (2006.01)

(52) U.S. Cl. .......................... 442/76; 442/394; 442/398

(58) Field of Classification Search ................... 442/76, 442/394, 398
See application file for complete search history.

(56) References Cited

U.S. PATENT DOCUMENTS 5,800,928 A * 9/1998 Fischer et al. ............... 428/500
6,093,496 A 7/2000 Dominguez et al.

FOREIGN PATENT DOCUMENTS

| EP | 0688826 A | | 12/1995 |
|---|---|---|---|
| EP | 2866891 | * | 9/2005 |
| FR | 2 866 891 A | | 9/2005 |

* cited by examiner

*Primary Examiner*—Lynda Salvatore
(74) *Attorney, Agent, or Firm*—Millen, White, Zelano & Branigan, P.C.

(57) ABSTRACT

The present invention relates to a structure comprising a substrate and at least one first layer applied to the substrate and made of a thermoplastic composition comprising at least one functionalized polyolefin obtained either by copolymerization or by grafting of a polyolefin backbone with an unsaturated monomer comprising an anhydride, acid or epoxide function, said functionalized polyolefin being grafted with polyether units comprising a terminal amine, by means of reactive extrusion, as a breathable waterproof material having a water vapor permeability of at least 300 $g/m^2$ 24 $h^{-1}$ measured according to the standard ASTM E96, method BW (38° C./50% relative humidity), for a film of 25 μm.

It also relates to the use of such a composition as a breathable waterproof material having a water vapor permeability of at least 300 $g/m^2$ 24 $h^{-1}$ (measured according to the standard ASTM E96, method BW 38° C./50% relative humidity), for a film of 25 μm.

27 Claims, No Drawings

STRUCTURE MADE FROM A THERMOPLASTIC COMPOSITION OF A POLYOLEFIN FUNCTIONALISED BY POLYETHER GRAFTS AND USE THEREOF

The present invention relates to a structure, in particular to a roofing-liner film structure or a house-wrapping film structure, comprising a substrate and at least one first layer applied to the substrate, said first layer being obtained from a thermoplastic composition comprising at least one functionalized polyolefin grafted with polyether units.

It also relates to the use of thermoplastic compositions comprising copolymers such as functionalized polyolefins grafted with polyether units, for instance polyoxyalkylene glycol, in particular polyoxyethylene glycol (PEG), so as to produce breathable waterproof materials, i.e. materials that are impermeable to liquid water but permeable to water in vapor form.

These materials are obtained by means of the various techniques for working in the molten state, for instance extrusion-casting, extrusion-blowing, for making films, or by coating or extrusion-coating on a support, such as a nonwoven.

In particular, these materials or films are of use in the construction field, for instance house wrapping, in roofing liner films, and in the medical field, hygiene and clothing.

There are in existence copolymers comprising polyamide blocks (in particular PA11, PA 12 and PA-6) and polyether blocks (in particular polyoxyethylene glycol (PEG)), sold in particular under the name Pebax® by Arkema, which have grown on the breathable waterproof film markets.

It is known practice, in particular through patent EP 0 688 826 B1 by the applicant, to obtain breathable waterproof films from a mixture comprising: a) at least one thermoplastic elastomer having polyether blocks, derived from polyoxyethylene glycol (PEG) (preferably, the thermoplastic elastomer is a copolymer having polyamide blocks and polyether blocks) and b) at least one copolymer of ethylene and of alkyl (meth)acrylate, grafted or copolymerized with an unsaturated carboxylic acid, its anhydride or an unsaturated epoxide; these films can be used in combination with nonwovens or fabrics, and have high water vapor permeabilities (reaching, for mixtures with 60% by weight of compound a), values of 22000 $g/m^2/24$ h according to the standard ASTM E96, method BW, for a film 25 µm thick), a low water uptake and good extrudability, but they are very expensive.

It is also known practice to use compositions of copolymers of ethylene and of alkyl (meth)acrylate in order to obtain, by extrusion or coating on supports, films having a low water vapor permeability.

Patent application EP 0 848 019 A1, in the applicant's name, describes a copolymer of ethylene and of (meth)acrylic esters of polyoxyalkylene glycol (the content of which can range up to 50% by weight), having a number-average molecular weight of between 5000 and 65 000, obtained by radical catalysis in an autoclave or tube reactor at high pressure. This copolymer is used to obtain breathable waterproof films having a water vapor permeability not exceeding 10 000 $g/m^2/24$ h according to the standard ASTM E96, method BW).

Patent application WO 98/51742 describes a composition comprising a blend of a polyolefin, such as polyethylene or polypropylene, with the grafting-reaction product of a maleated polypropylene (obtained by radical grafting of maleic anhydride) and a polyetheramine. This composition is used for dyeable fibers, but not breathable waterproof films. This document, in addition, does not disclose the grafting of functionalized ethylene/acrylic ester copolymers with polyetheramine.

U.S. Pat. No. 6,093,496, U.S. Pat. No. 6,146,574 and U.S. Pat. No. 6,420,482 also describe a composition comprising a blend of a polyolefin, such as polyethylene or polypropylene, with the grafting-reaction product of a maleated polypropylene or a maleated polyethylene and of a polyetheromine. This composition can be used to manufacture automobile parts or dyeable fibers. No use in breathable waterproof films is disclosed, nor is the grafting of functionalized copolymers other than polypropylene (PP) or polyethylene (PE).

Patent application FR 2 866 891, in the applicant's name, describes a thermoplastic composition comprising a functionalized polyolefin, grafted with polyether units, based on a copolymer consisting of a polyolefin backbone and at least one polyether graft, the backbone having been functionalized beforehand either by polymerization or by grafting with an unsaturated monomer X having a function capable of reacting with at least one terminal amine of the polyether units, characterized in that the functionalized polyolefin is a copolymer of ethylene, of alkyl (meth)acrylate and of at least the unsaturated monomer X, comprising an anhydride, acid or epoxide function. It can be used as permanent antistatic additives in thermoplastic matrices.

Patent application WO 00/12801 A1 relates to nonwoven webs based on hydrophilic polymer fibers; these polymers being obtained by reaction between an olefinic polymer modified with maleic anhydride and a polyetheramine; it does not involve films and the water vapor permeability characteristics are not mentioned.

Patent application EP 1 388 345 A1 relates to polymeric compositions obtained by reaction of a thermoplastic polymer and a hydrophilic plasticizer, linked to one another by covalent bonding; all the exemplary embodiments describe processes for making compositions in emulsion or solvent medium (with, as polymer, an aqueous dispersion of polyurethane, such as Ucecoat); the layer obtained with these compositions has a water vapor permeability of at least 600 $g/m^2/24$ h with a film thickness of at least 20 µm.

Patent application WO 02/43958 describes a method of extruding, onto a substrate, a film based on a thermoplastic composition in the form of a blend of a copolyester (the chemical composition of which is not specified) and of an ethylene/alkyl acrylate copolymer, with a compatibilizing agent, having good substrate-adhesion properties and also a certain moisture vapor transmission rate (MVTR) according to a method not described. This film is used as a liquid-barrier material in hygiene articles.

THE TECHNICAL PROBLEM

Among the documents mentioned above, some claim materials containing functionalized polyolefins which are principally maleic anhydride-grafted polypropylenes modified with polyetheramines, but do not disclose the use of an ethylene/alkyl (meth)acrylate copolymer, is nor their use for producing breathable waterproof films. Others endeavor to improve the hydrophilicity of films obtained from compositions by means of complex and expensive emulsion processes or processes with solvents.

DESCRIPTION OF THE INVENTION

The invention relates to a structure comprising a substrate and at least one first layer applied to the substrate.

According to the invention, said first layer is made from a thermoplastic composition comprising at least one functionalized polyolefin obtained either by copolymerization or by grafting of a polyolefin backbone with an unsaturated monomer comprising an anhydride, acid or epoxide function, said functionalized polyolefin being grafted with polyether units having a terminal amine, by means of reactive extrusion, as a breathable waterproof material having a water vapor permeability of at least 300 g/m$^2$ 24 h$^{-1}$ measured according to the standard ASTM E96, method BW (38° C./50% relative humidity) for a film of 25 µm.

In addition to being mechanically strong, such a structure is impermeable to liquid water but permeable to water in vapor form, in particular by virtue of the presence of the first layer. Due to such properties, the structure according to the invention can in particular be used to form a roofing liner film or a house wrapping film.

In one advantageous version, the support of the structure according to the invention is chosen from a nonwoven made of fibrous material, a textile material and a discontinuous mat of natural or synthetic fibers.

In a nonlimiting manner, mention may be made of a polypropylene nonwoven, hemp or alternatively kenaf.

The applicant has also found an advantageous use as breathable waterproof materials having high water vapor permeability properties, while at the same time having relatively low production costs, and also good processability, of thermoplastic compositions comprising a polyolefin functionalized with an unsaturated monomer comprising an anhydride, acid or epoxide function, and grafted with polyether units, in a reactive extrusion process.

It has been noted that the hydrophilicity of these materials is provided by the grafted PEG segments.

The synthesis of these thermoplastic compositions is obtained by reactive extrusion as described in patent application FR 2 866 891, the content of which is incorporated into the present application.

The invention relates to the use of a thermoplastic composition comprising at least one functionalized polyolefin obtained either by copolymerization or by grafting of a polyolefin backbone with an unsaturated monomer comprising an anhydride, acid or epoxide function, this functionalized polyolefin being grafted with polyether units having a terminal amine, by means of reactive extrusion, as breathable waterproof materials, in particular in the form of films, having a water vapor permeability of at least 300 g/m$^2$ 24 h$^{-1}$ (measured according to the standard ASTM E96, method BW (38° C./50% relative humidity), for a film of 25 µm).

Preferably, according to the invention, the polyolefin backbone of the functionalized polyolefin is a copolymer of ethylene and of alkyl (meth)acrylate, the latter being preferably chosen from methyl (meth)acrylate, ethyl acrylate, n-butyl acrylate, isobutyl acrylate, octyl acrylate and 2-ethylhexyl acrylate.

In addition, the grafting of the functionalized polyolefin with polyether units is obtained by reaction of its anhydride, acid or epoxide function with a polyether having a terminal amine, such as a polyoxyalkylene glycol having at least one chain end of amine type.

Preferably, according to the invention, the anhydride function of the unsaturated monomer is present in the form of an unsaturated dicarboxylic acid anhydride, which is chosen from maleic anhydride, itaconic anhydride, citraconic anhydride and tetrahydrophthalic anhydride.

In particular, the preferred unsaturated dicarboxylic acid anhydride is maleic anhydride.

According to a preferred embodiment, the functionalized polyolefin is a copolymer of ethylene, of ethyl acrylate or of n-butyl acrylate, the content of which is between 2% and 40% by weight of the copolymer, and of maleic anhydride, the content of which is between 0.2% and 6% by weight of the copolymer.

Moreover, the epoxide function of the unsaturated monomer is present in the form of an unsaturated epoxide of the aliphatic glycidyl ester type, such as, in particular, glycidyl methacrylate (GMA).

Preferably, the polyoxyalkylene glycol of the polyether having a terminal amine is chosen from polyoxyethylene glycol (PEG), polyoxypropylene glycol (PPG), polyoxytetramethylene glycol (PTMG), copolymers of ethylene oxide, of propylene oxide and of tetrahydrofuran, and also blends of two or more of these compounds.

According to a variant embodiment, the thermoplastic compositions also comprise, in a blend, another polyolefin, which may be of the same nature as or of a different nature from that of the polyolefin backbone above, and which is in particular an ethylene/alkyl (meth)acrylate copolymer.

However, other types of polyolefin are also suitable, such as a homopolymer or copolymer of alpha-olefins or of diolefins, for instance ethylene, propylene, 1-butene, 1-octene or butadiene, and similarly ethylene/vinyl acetate (EVA) copolymers or ethylene/acrylic acid (EAA) copolymers.

The blend can be produced by on-line dilution on the conversion unit, for example on a single-screw extruder equipped with a sheet die.

According to a preferred embodiment, the process for using the compositions used to obtain breathable waterproof materials and the structures according to the invention is characterized in that the compositions are applied on an extrusion-casting line, in the molten state, at a temperature of at least 120° C. so as to form a film having a minimum thickness of 5 µm.

This type of process makes it possible to optimize the conversion conditions for preparing films that are as thin as possible, advantageously between 10 and 50 µm thick, preferably between 20 and 50 µm thick, and more particularly approximately 25 µm, derived from on-line blends of the materials according to the invention diluted in varied proportions and without having microperforations. By adjusting the temperature and drawing-speed parameters of the line, it is possible to control the thickness of the films.

According to another preferred embodiment, the process for using the compositions used to obtain breathable waterproof materials according to the invention is characterized in that the compositions are applied, in the molten state on an extrusion-coating line, onto a substrate such as a nonwoven made of fibrous material or a textile material, so as to form a complex with a weight of at least 5 g/m$^2$.

According to a known process, the first layer of the structure according to the invention is extruded and then coated, in the molten state, onto the solid substrate.

When the first layer is in the form of a thermoplastic film, applied to the substrate, this thermoplastic film has a thickness of between 5 and 50 µm, and preferably between approximately 5 and 10 µm.

Advantageously, in the context of an application by extrusion-coating, from 10 to 50 g/m$^2$ of thermoplastic film are deposited onto the substrate.

The breathable waterproof materials, films or structures obtained according to the invention are particularly suitable for uses in construction, such as roofing liner films or house wrapping films; however, other uses, in particular in the medical field, hygiene products (such as diapers), or clothing can also be envisioned.

According to a preferred embodiment of the invention, in the process for obtaining this thermoplastic composition, the grafting of the polyether units onto the functionalized polyolefin is obtained by means of reactive extrusion, especially in an extruder, at temperatures of in particular between 150 and 300° C., with a screw rotation speed of 50 to 1200 rpm, and the degree of grafting of the polyether groups is around 50% (i.e. the degree of conversion of the $NH_2$ functions introduced).

When the functionalized polyolefin is an ethylene/alkyl (meth)acrylate/maleic anhydride copolymer, the reaction, for example with a polyether such as a PEG monomethyl ether monoamine involves the formation of amic acid so as to give an imide junction.

It has now been discovered that, from a morphological point of view, these grafted copolymers comprising polyether units, of the ethylene oxide (EO)/propylene oxide (PO) copolymer type, are organized on several scales, with macrophase separation (nongrafted polyether) accompanied by nanostructuring demonstrated by TEM (transmission electron microscopy) analysis.

DETAILED DESCRIPTION OF THE INVENTION

As regards the polyolefin backbone, a polyolefin is defined as a homopolymer or copolymer of alpha-olefins or of diolefins, for instance ethylene, propylene, 1-butene, 1-octene or butadiene.

Examples of alpha-olefins containing 3 to 30 carbon atoms, as possible comonomers, include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docoene, 1-tetracocene, 1-hexacocene, 1-octacocene and 1-triacontene. These alpha-olefins can be used alone or as a blend of two or more than two.

By way of example of a polyolefin, mention may be made of:
  ethylene homopolymers and copolymers; in particular, by way of example of polyethylenes, mention may be made of:
    low-density polyethylene (LDPE)
    high-density polyethylene (HDPE)
    linear low-density polyethylene (LLDPE)
    very-low-density polyethylene (VLDPE)
    polyethylene obtained by metallocene catalysis,
i.e. the polymers obtained by copolymerization of ethylene and of alpha-olefin, such as propylene, butene, hexene or octene, in the presence of a single-site catalyst generally consisting of a zirconium or titanium atom and two cyclic alkyl molecules bound to the metal. More specifically, the metallocene catalysts are usually composed of two cyclopentadiene rings bound to the metal. These catalysts are commonly used with aluminoxanes as cocatalysts or activators, preferably methylaluminoxone (MAO). Hafnium can also be used as metal to which the cyclopentadiene is attached. Other metallocenes may include transition metals of groups IV A, V A and VI A. Metals of the lanthanide series may also be used;
  propylene homopolymers or copolymers;
  ethylene/alpha-olefin copolymers, such as ethylene/propylene copolymers, EPRs (abbreviation ethylene-propylene-rubber) and ethylene/propylene/diene (EPDM) copolymers;
  styrene/ethylene-butene/styrene (SEBS), styrene/butadiene/styrene (SBS), styrene/isoprene/styrene (SIS), and styrene/ethylene-propylene/styrene (SEPS) block copolymers;
  copolymers of ethylene with at least one product chosen from the salts or esters of unsaturated carboxylic acids, for instance alkyl (meth)acrylates, it being possible for the alkyls to contain up to 24 carbon atoms.

Examples of alkyl acrylate or methacrylate are in particular methyl methacrylate, ethyl acrylate, n-butyl acrylate, isobutyl acrylate and 2-ethylhexyl acrylate;
  vinyl esters of saturated carboxylic acids, for instance vinyl acetate or vinyl propionate;
  unsaturated epoxides.

Examples of unsaturated epoxides are, in particular:
  aliphatic glycidyl esters and ethers, such as allyl glycidyl ether, vinyl glycidyl ether, glycidyl maleate, glycidyl itaconate, glycidyl acrylate and glycidyl methacrylate, and
  alicyclic glycidyl esters and ethers, such as 2-cyclohexene-1-glycidyl ether, cyclohexene-4,5-diglycidyl carboxylate, cyclohexene-4-glycidyl carboxylate, 5-norbornene-2-methyl-2-glycidyl carboxylate and endo-cis-bicyclo(2,2,1)-5-heptene-2,3-diglycidyl dicarboxylate;
  unsaturated carboxylic acids, salts thereof, anhydrides thereof.

Examples of unsaturated dicarboxylic acid anhydrides are in particular maleic anhydride, itaconic anhydride, citraconic anhydride and tetrahydrophthalic anhydride;
  dienes such as, for example, 1,4-hexadiene;
  or vinyl esters of saturated carboxylic acids, such as vinyl acetate, it being possible for the proportion of comonomer to reach 40% by weight;
  EPR (ethylene-propylene-rubber) elastomers;
  EPDM (ethylene-propylene-diene) elastomers;
  blends of polyethylene with an EPR or an EPDM;
  ethylene/alkyl (meth)acrylate copolymers that may contain up to 60% by weight of (meth)acrylate, and preferably 2% to 40%;
  ethylene/alkyl (meth)acrylate/maleic anhydride copolymers obtained by copolymerization of the three monomers, the proportions of (meth)acrylate being as for the copolymers above, the amount of maleic anhydride being up to 10%, and preferably 0.2% to 6% by weight;
  ethylene/vinyl acetate/maleic anhydride copolymers obtained by copolymerization of the three monomers, the proportions being the same as in the preceding copolymer.

By way of example, mention may be made of ethylene copolymers such as the copolymers of ethylene with vinyl acetate, obtained by the high-pressure radical process, (meth)acrylic esters of (meth)acrylic acid and of an alcohol containing from 1 to 24 carbon atoms, and advantageously from 1 to 9, radical terpolymers using, in addition, a third monomer chosen from unsaturated monomers than can be copolymerized with ethylene, such as acrylic acid, maleic anhydride or glycidyl methacrylate. These flexible copolymers may also be copolymers of ethylene with alpha-olefins containing from 3 to 8 carbon atoms, such as EPRs, or very-low-density copolymers of ethylene with butene, hexene or octene, having a density of between 0.860 and 0.910 $g/cm^3$, obtained by metallocene or Ziegler-Natta catalysis. The term "flexible polyolefins" is intended to mean also blends of 2 or more flexible polyolefins.

The invention is of particular use for copolymers of ethylene and alkyl (meth)acrylates. The alkyl may contain up to 24 carbon atoms. Preferably, the (meth)acrylates are chosen from those mentioned above. These polymers advantageously comprise up to 40% by weight of (meth)acrylate, and preferably 3% to 35%. Their MFI is advantageously between 0.1 and 50 (at 190° C.-2.16 kg).

As regards the unsaturated monomer, it may, for example, be an unsaturated carboxylic acid anhydride. The unsaturated carboxylic acid anhydride may be chosen, for example, from maleic anhydride, itaconic anhydride, citraconic anhydride, allylsuccinic anhydride, cyclohex-4-ene-1,2-dicarboxylic anhydride, 4-methylenecyclohex-4-ene-1,2-dicarboxylic anhydride, bicyclo(2,2,1)hept-5-ene-2,3-dicarboxylic anhydride and x-methylbicyclo(2,2,1)hept-5-ene-2,2-dicarboxylic anhydride. Maleic anhydride is advantageously used.

All or part of the anhydride can be replaced with an unsaturated carboxylic acid such as, for example, (meth)acrylic acid, without departing from the context of the invention.

The monomer may also be an unsaturated epoxide of the aliphatic glycidyl ester or ether type, such as allyl glycidyl ether, vinyl glycidyl ether, glycidyl maleate, glycidyl itaconate, glycidyl acrylate and glycidyl methacrylate.

Advantageously, the polyolefin backbones to which are attached the residues of X are polyethylenes grafted with X or copolymers of ethylene and of X, which are obtained, for example, by radical polymerization.

Ethylene/maleic anhydride and ethylene/alkyl (meth)acrylate/maleic anhydride copolymers are advantageously used. These copolymers comprise from 0.2% to 10% by weight of maleic anhydride, from 0 to 40%, and preferably 5% to 40% by weight of alkyl (meth)acrylate. Their MFI is between 5 and 100 (190° C.-2.16 kg). The alkyl (meth)acrylates have already been described above. The melting point is between 60 and 100° C.

As regards the polyether units having a terminal amine, or polyetheramines, they are preferably monoamines, but also polyamines, having a molecular mass of between approximately 100 and 12 000 g/mol; the polyether blocks of these polyetheramines are addition products of cyclic ethers, such as ethylene oxide (EO), propylene oxide (PO) or mixtures thereof, with glycols chosen in particular from the group consisting of ethylene glycol, glycerol, 1,2-propanediol and pentaerythritol.

Use is preferably made of polyether blocks of the type polyethylene glycol (PEG), polypropylene glycol (PPG), copolymers of polyethylene glycol and of polypropylene glycol, poly(1,2-butylene glycol) and poly(tetramethylene glycol) (PTMG).

The polyetheramines used, according to the invention, can be obtained according to well-known amination processes, as described in particular in U.S. Pat. No. 3,654,370, U.S. Pat. No. 4,152,353, U.S. Pat. No. 4,618,717 and U.S. Pat. No. 5,457,147.

Use is preferably made of polyether units or blocks of the polyethylene glycol/polypropylene glycol monoamine copolymer type, in the form of short segments (Mn of between 100 and 10 000 g/mol, and preferably between 250 and 5000 g/mol); such polyether monoamine compounds are described, in particular, in patents WO 98/51742 and U.S. Pat. No. 6,465,606, the content of which is incorporated into the present application.

However, other polyethers, such as polypropylene glycol (PPG) or polytetramethylene glycol (PTMG), or copolymers thereof or blends thereof, may also be used.

The addition of the polyether monoamine units to the polyolefin backbone containing X is carried out by reaction of an amine function of the polyether with X. Advantageously, when X bears an anhydride or acid function, imide or amide junctions are thus created.

Advantageously, there is, on average, between 0.1% and 25% by weight of X per chain attached to the polyolefin backbone. Those skilled in the art can readily determine these amounts by FTIR analysis.

The addition of the polyether having a terminal amine to the polyolefin trunk containing X is preferably carried out in the molten state. It is thus possible, in an extruder, to blend the polyether and the backbone at a temperature generally between 150 and 300° C.

The weight ratios of the amounts of polyether having a terminal amine and of functionalized polyolefin introduced into the blend are between 1/99 and 80/20, and preferably between 20/80 and 50/50.

As regards the polyolefin which can be blended with the functionalized polyolefin grafted with polyether units of the invention, any type of polyolefin as described above for the polyolefin backbone can be used; in particular, copolymers of ethylene and of alkyl (meth)acrylate are particularly suitable.

The compositions of the invention can be prepared by melt blending in extruders (single-screw or twin-screw), Buss co-kneaders, internal mixers and, in general, the usual devices for blending thermoplastics, and preferably co-rotating twin-screw extruders.

The compositions of the invention can be prepared in a single step in an extruder. In the first zones, the functionalized polyolefin (for example, an ethylene/alkyl (meth)acrylate/maleic anhydride copolymer) is introduced, and then the polyether having a terminal amine.

The average residence time of the molten material in the extruder may be between 5 seconds and 10 minutes, and preferably between 10 and 60 seconds. The yield from this addition is evaluated by selective extraction of the free polyethers, i.e. those which have not reacted to form the final polyether-block-grafted copolymer.

Advantageously, the proportion of grafted polyether blocks is approximately 50% of the amount introduced.

The compositions of the invention may also comprise various additives, in particular slip agents such as silica, N,N'-ethylenebisamide, calcium stearate or magnesium stearate. They may also comprise antioxidants, anti-UVs, mineral fillers and dye pigments.

EXAMPLES

A: Synthesis of the Functionalized Polyolefins Grafted with Polyethers by Means of Reactive Extrusion Example A1

Lotader® 3210 from Arkema, an ethylene terpolymer, with 6% by weight of butyl acrylate and 3% by weight of maleic anhydride, having a melt index or MFI equal to 5 g/10 min (measured at 190° C. under 2.16 kg), is blended in a Werner and Pfleiderer co-rotating twin-screw extruder 30 mm in diameter, equipped with several blending zones, with a screw speed of 300 rpm and a flat temperature profile at 240° C., and with a vacuum, with a Jeffamine M2070 polyether having a terminal amine, from Huntsmann, with a molecular mass Mn of 2000 g/mol, an ethylene oxide unit/propylene oxide unit molar ratio of 31/10 and an Mp of 17° C. The total flow rate is 15.4 kg/h.

The proportions introduced into the extruder are such that the terpolymer/polyether weight ratio is 65/35; this amount corresponding to the anhydride/amine stoichiometry.

The product obtained has an MFI of 3.8 g/10 min (at 190° C. under 2.16 kg), and the amount of grafted polyether, measured by Fourier transform infrared spectroscopy, is approximately half that of the polyether introduced.

Example A2

A grafting reaction is reproduced under extrusion conditions similar to those of example 1, except for the temperature profile, which is a flat 220° C., with the same polyetheramine, and with the Lotader® 3410 terpolymer from Arkema, which is an ethylene terpolymer with 18% by weight of butyl acrylate and 3% by weight of maleic anhydride, and a melt index or MFI equal to 5 g/10 min (measured at 190° C. under 2.16 kg).

The product thus produced has an MFI of 4.7 g/10 min (at 190° C. under 2.16 kg).

Example A3

A grafting reaction is reproduced under extrusion conditions similar to those of example 2, with the Lotader® 6200 terpolymer from Arkema, which is an ethylene terpolymer with 6% by weight of ethyl acrylate and 3% by weight of maleic anhydride, and a melt index or MFI equal to 40 g/10 min (measured at 190° C. under 2.16 kg).

The product thus produced has an MFI of 33 g/10 min (at 190° C. under 2.16 kg).

Example A4

A grafting reaction is reproduced under extrusion conditions similar to those of example 2, with the Lotader® 7500 terpolymer from Arkema, which is an ethylene terpolymer with 18% by weight of ethyl acrylate and 3% by weight of maleic anhydride, and a melt index or MFI equal to 70 g/10 min (measured at 190° C. under 2.16 kg).

The product thus produced is very fluid and has an MFI>150 g/10 min (at 190° C. under 2.16 kg).

Example A5

A grafting reaction is reproduced under extrusion conditions similar to those of example 2, except for the terpolymer/polyether ratio, which is 57/43 by weight, and for the flow rate, which is 12.8 kg/h, with the Lotader® 4210 terpolymer from Arkema, which is an ethylene terpolymer with 6% by weight of butyl acrylate and 3.7% by weight of maleic anhydride, and a melt index or MFI equal to 13.5 g/10 min (measured at 190° C. under 2.16 kg).

The product thus produced has an MFI of 20 g/10 min (at 190° C. under 2.16 kg).

The results are given in table 1 below.

TABLE 1

| Examples | A1 | A2 | A3 | A4 | A5 |
|---|---|---|---|---|---|
| Lotader 3210 | 65 | | | | |
| Lotader 3410 | | 65 | | | |
| Lotader 6200 | | | 65 | | |
| Lotader 7500 | | | | 65 | |
| Lotader 4210 | | | | | 57 |
| Jeffamine M 2070 | 35 | 35 | 35 | 35 | 33 |
| flow rate (kg/h) | 15.4 | 15.4 | 15.4 | 15.4 | 12.8 |
| barrel temperature (° C.) | 240 | 220 | 220 | 220 | 220 |
| rotation speed (rpm) | 300 | 300 | 300 | 300 | 300 |
| MFI (190° C., 2.16 kg) | 3.8 | 4.7 | 33 | >150 | 20 |

B. On-Line Dilution of the Polymers Obtained in A and Preparation of Films by Extrusion Casting The materials prepared in examples A1 to A2 are subsequently diluted on-line with Lotryl®18 MG02 from the company Arkema, which is an ethylene/methyl acrylate copolymer with 18% by weight of acrylate and a melt index or MFI equal to 2 g/10 min (measured at 190° C. under 2.16 kg), so as to obtain the compositions B1 to B8, which are made into films by means of the extrusion-casting technique using the Collin line equipped with a single-screw extruder with a diameter of 30 mm and a length equal to 30 times the diameter (without kneading elements), a die 250 mm wide with a lip aperture of 300 µm, and a Collin feed block. The temperature in the extruder, the die and the feed block is constant at 210° C.

Table 2 below gives the compositions B1 to B8 of the films of approximately 100 µm in thickness, obtained from the polymers of examples A1 and A2, diluted under the conditions above, with the value of the theoretical amounts, by weight, of polyetheramine (Jeffamine M2070) introduced. The composition B9 corresponds to the undiluted product A2.

TABLE 2

| Examples | B1 | B2 | B3 | B4 | B5 | B6 | B7 | B8 | B9 |
|---|---|---|---|---|---|---|---|---|---|
| A1 | 30 | 43 | 57 | 69 | | | | | |
| A2 | | | | | 30 | 43 | 57 | 69 | 100 |
| % Jeffamine M2070 | 10.5 | 15 | 20 | 24 | 10.5 | 15 | 20 | 24 | 35 |
| Lotryl 18MG02 | 70 | 57 | 43 | 31 | 70 | 57 | 43 | 31 | 0 |

C. Water Vapor Permeability of the Films Obtained

The water vapor permeability values measured on the films obtained, according to the standard ASTM 96E, method BW (38° C./50% relative humidity), for a film 25 µm thick, are given in table 3 below.

TABLE 3

| Examples | B1 | B2 | B3 | B4 | B5 | B6 | B7 | B8 | B9 |
|---|---|---|---|---|---|---|---|---|---|
| % Jeffamine M2070 | 10.5 | 15 | 20 | 24 | 10.5 | 15 | 20 | 24 | 35 |
| Permeability film 25 µm (g/m$^2$ 24 h$^{-1}$) | 325 | 602 | 612 | 3776 | 347 | 728 | 1905 | 21127 | 25000 |

It is noted that the results in the above table show:
  that the water vapor permeability is controlled first by the amount of PEG in the material and that, the richer the material is in PEG, the greater this permeability, and
  that the water vapor permeability is subsequently controlled by the nature of grafted functionalized polyolefin and that, the richer the starting polyolefin is in acrylic monomer, and therefore the more amorphous it is, the greater this permeability.

The invention claimed is:

1. A composite structure comprising a nonwoven made of a fibrous material and applied thereon at least one first layer, said at least one first layer being made from a thermoplastic composition comprising at least one functionalized polyolefin obtained either by copolymerization or by grafting of a polyolefin backbone with an unsaturated monomer comprising an anhydride, acid or epoxide function, said functionalized polyolefin being grafted with polyether grafting agents comprising a terminal amine, the functionalized polyolefin grafted with polyether being obtained by reactive extrusion as a breathable waterproof material having a water vapor permeability of at least 300 g/m$^2$ 24 h$^{-1}$ measured according to the standard ASTM E96, method BW (38° C./50% relative humidity), for a film of 25 μm.

2. The structure as claimed in claim 1, wherein the polyolefin backbone of the functionalized polyolefin is a copolymer of ethylene and of alkyl (meth)acrylate.

3. The structure as claimed in claim 1, wherein the grafting of the functionalized polyolefin with polyether units is obtained by reaction of its anhydride, acid or epoxide function, with a polyether comprising a terminal amine.

4. The structure as claimed in claim 1, wherein the anhydride function of the unsaturated monomer is present in the form of an unsaturated dicarboxylic acid anhydride.

5. The structure as claimed in claim 1, wherein the epoxide function of the unsaturated monomer is present in the form of an unsaturated epoxide of the aliphatic glycidyl ester type.

6. A method for preparing a composite structure according to claim 1 comprising applying the at least one first payer onto the nonwoven made of a fibrous material, said at least one first layer being made from a thermoplastic composition, which is prepared by subjecting to reactive extrusion a thermoplastic composition comprising at least one functionalized polyolefin obtained either by copolymerization or by grafting of a polyolefin backbone with an unsaturated monomer comprising an anhydride, acid or epoxide function, said functionalized polyolefin being grafted with polyether units comprising a terminal amine, to form a breathable waterproof film having a water vapor permeability of at least 300 g/m$^2$ 24 h$^{-1}$ measured according to the standard ASTM E96, method BW (38° C./50% relative humidity), for a film of 25 μm.

7. A method as claimed in claim 6, wherein the polyolefin backbone of the functionalized polyolefin is a copolymer of ethylene and of alkyl (meth)acrylate.

8. A method as claimed in claim 6, wherein the functionalized polyolefin is grafted with polyether units obtained by reaction of its anhydride, acid or epoxide function, with a polyether comprising a terminal amine, or a polyoxyalkylene glycol having at least one chain end of amine type.

9. A method as claimed in claim 8, wherein the polyoxyalkylene glycol is selected from the group consisting of polyoxyethylene glycol (PEG), polyoxypropylene glycol (PPG), polyoxytetramethylene glycol (PTMG), copolymers of ethylene oxide, of propylene oxide and of tetrahydrofuran, and blends thereof.

10. A method as claimed in claim 6, wherein the anhydride function of the unsaturated monomer is present in the form of an unsaturated dicarboxylic acid anhydride.

11. A method as claimed in claim 6, wherein the functionalized polyolefin is a copolymer of ethylene, of ethyl acrylate or of n-butyl acrylate, the content of which is between 2% and 40% by weight of the copolymer, and of maleic anhydride, the content of which is between 0.2% and 6% by weight of the copolymer.

12. A method as claimed in claim 6, wherein the epoxide function of the unsaturated monomer is present in the form of an unsaturated epoxide of the aliphatic glycidyl ester type, such as, in particular, glycidyl methacrylate (GMA).

13. A method as claimed in claim 6, wherein the thermoplastic composition also comprises, as a blend, an ethylene/alkyl (meth)acrylate copolymer.

14. A method as claimed in claim 6, wherein the thermoplastic composition subjected in the molten state, to extrusion-casting, at a temperature of at least 120° C. so as to form a film having a minimum thickness of 5 μm.

15. A method as claimed in claim 6, wherein the thermoplastic composition subjected in the molten state, to extrusion-coating, onto a substrate, so as to form a complex with a weight of at least 5 g/m$^2$.

16. A structure according to claim 1, which is in a form suitable for use as a roofing liner film or a house wrapping film.

17. A structure according to claim 1, wherein the fibrous material is a non-woven polypropylene, a textile material or a discontinuous mat of natural or synthetic fibers.

18. A structure according to claim 2, wherein the alkyl (meth)acrylate is selected from the group consisting of methyl (meth)acrylate, ethyl acrylate, n-butyl acrylate, isobutyl acrylate, octyl acrylate and 2-ethylhexyl acrylate.

19. A structure according to claim 3, wherein the polyether comprising a terminal amine is any of a polyoxyalkylene glycol having at least one amine chain end.

20. A structure according to claim 4, wherein the unsaturated dicarboxylic acid anhydride is any of maleic anhydride, itaconic anhydride, citraconic anhydride and tetrahydrophthalic anhydride.

21. A structure as claimed in claim 1, wherein the polyolefin is functionalized with glycidyl methacrylate (GMA).

22. A method according to claim 7, wherein the functionalized polyolefin is a copolymer of ethylene and any of methyl methacrylate, ethyl methacrylate, n-butylacrylate, isobutylacrylate, octylacrylate and 2-ethylhexylacrylate.

23. A method according to claim 10, wherein the unsaturated dicarboxylic acid anhydride is any of maleic anhydride, itaconic anhydride, citraconic anhydride and tetrahydrophthalic anhydride.

24. A method according to claim 15, wherein the substrate is a non-woven material.

25. A structure according to claim 1, wherein the polyether grafting agent comprising a terminal amine comprises a polyether monoamine.

26. A structure according to claim 1, wherein the polyether grafting agent comprising a terminal amine comprises a polyether amine.

27. A composite structure comprising a nonwoven made of a fibrous material and applied thereon at least one first layer, said at least one first layer being made from a thermoplastic composition consisting essentially of at least one functionalized polyolefin obtained either by copolymerization or by grafting of a polyolefin backbone with an unsaturated monomer comprising an anhydride, acid or epoxide function, said functionalized polyolefin being grafted with polyether grafting agents comprising a terminal amine, the functionalized polyolefin grafted with polyether being obtained by reactive extrusion as a breathable waterproof material having a water vapor permeability of at least 300 g/m$^2$ 24 h$^{-1}$ measured according to the standard ASTM E96, method BW (38° C./50% relative humidity), for a film of 25 μm.

* * * * *